US005565266A

United States Patent [19]
Hatwar et al.

[11] Patent Number: 5,565,266
[45] Date of Patent: Oct. 15, 1996

[54] MULTILAYER MAGNETOOPTIC RECORDING MEDIA

[75] Inventors: Tukaram K. Hatwar, Penfield; Yuan-Sheng Tyan, Webster; Anthony C. Palumbo, Rochester; Charles F. Brucker, Fairport, all of N.Y.

[73] Assignee: Eastman Kodak Company, Rochester, N.Y.

[21] Appl. No.: 76,604

[22] Filed: Jun. 14, 1993

[51] Int. Cl.$^6$ .................................. G11B 5/66; B32B 5/16
[52] U.S. Cl. ...................... 428/332; 428/336; 428/611; 428/635; 428/668; 428/670; 428/634 MM; 428/694 DE; 428/694 XS; 428/694 TM; 428/900; 428/928; 360/135; 369/13
[58] Field of Search .................................. 428/694 MM, 428/694 DE, 694 TM, 336, 332, 900, 611, 635, 668, 670, 928, 694 XS; 369/13, 135

[56] References Cited

U.S. PATENT DOCUMENTS 4,661,420 4/1987 Nakamura et al. ................. 428/692
5,082,749 1/1992 Carcia ................................ 428/699
5,192,626 3/1993 Sekiya et al. ...................... 428/694 R

FOREIGN PATENT DOCUMENTS 0304873 3/1989 European Pat. Off. .
0304927 3/1989 European Pat. Off. .

OTHER PUBLICATIONS

"Dielectric Enhancement Layers for a Co/Pt Multilayer Magnetooptic Recording Medium", Carcia et al, Appl. Phys Lett. 58 (1991), pp. 191–193.

S. Sumi et al, Abstract Mq–3, "Magnetooptic Recording International Symposium", (MORIS), Dec., 1992, Tuscon, Arizona.

"Daicure Clear SD–17", a UV curable acrylic resin available from Dainippon Ink and Chemicals, Inc.

*Primary Examiner*—Leszek Kiliman
*Attorney, Agent, or Firm*—Raymond L. Owens

[57] ABSTRACT

A magnetooptic medium which includes a substrate, an amorphous seed layer and a recording multilayer layer. The seed layer is ITO, Si or SiC, and the recording multilayer includes alternating layers of cobalt/platinum or cobalt/palladium or mixtures thereof.

8 Claims, 11 Drawing Sheets

MULTILAYER MAGNETOOPTIC RECORDING MEDIA

CROSS REFERENCE TO RELATED APPLICATION

Reference is made to commonly assigned U.S. patent application Ser. No. 08/076,326, filed Jun. 4, 1993 to Charles F. Brucker et al filed concurrently herewith, now U.S. Pat. No. 5,407,755, the teachings of which are incorporated herein.

FIELD OF THE INVENTION

This invention relates to magnetooptical (MO) recording media having a cobalt/platinum (Co/Pt) or cobalt/palladium (Co/Pd) multilayered structure.

BACKGROUND OF THE INVENTION

Co/Pt multilayers have been used for MO recording media. These materials have perpendicular magnetic anisotropy, large Kerr rotation at short wavelength and excellent environmental stability. However, these materials when deposited by conventional sputtering processes possess low coercivity. Attempts have been made to increase the coercivity by controlling the Co/Pt ratio, using seed layers of metals and dielectrics, and etching the substrate before depositing the multilayer (see Magnetooptic Recording Medium, European Patent Appln. 0304873 (1988)); Perpendicular Magnetic Recording Media, European Patent Application 0304927 (1989); U.S. Pat. No. 5,082,749; and "Dielectric Enhancement Layers for a Co/Pt Multilayer Magnetooptic Recording Medium", Carcia et al, Appl. Phys Lett. 58 (1991), pages 191–193. European Patent Application 0304927 gives an example wherein the use of silicon decreases the coercivity of a Co/Pt multilayer structure. For high Co/Pt ratio, even though coercivity up to 1000 Oe can be obtained, the hysteresis loops are not square. For through substrate recording, the use of a metal seed layer is objectionable since it attenuates the Kerr rotation, decreases the figure of merit and decreases the recording sensitivity. Some of the dielectrics such as oxides and nitrides of Zn, In, Al, Ta, Mg, Si, Sn, Fe, Zr, Bi metals increase the coercivity but the thickness of these layers is usually recommended to be more than 100 nm for sufficient optical enhancement and 50 nm for sufficient coercivity enhancement. This also increases the deposition time and lowers the production throughput.

It has been noted in the Carcia et al reference Ibid, that the 100 nm thick seed layer of $In_2O_3$ with 4% Sn enhanced the coercivity of the Co/Pt multilayer. However, no particulars were discussed with respect to the seed layer.

Also all these dielectrics are highly crystalline and may give rise to noise during recording process. Heretofore, it was believed that a highly crystalline seed layer was required to improve the texture and growth of the Co/Pt multilayer structures. Therefore, thick seed layers were needed. Furthermore, most oxides and nitrides are difficult to deposit using simple non-reactive dc sputtering at high deposition rate. The low deposition rate and the large structure thickness require long deposition time, result in low production throughput, induce thermal damage to the sensitive substrate such as PC and gives rise to mechanical stresses causing deformation of the structure. In extreme cases cracking and delamination of the structure may occur.

SUMMARY OF THE INVENTION

It is therefore an object of the present invention to provide an improved magneto optic media structure having a Co/Pt multilayer but with increased coercivity and squareness, and manufacturing throughput. This invention provides a solution to problems mentioned above. We have used several polycrystalline as well as amorphous materials as seed layers for depositing Co/Pt multilayer media. We found quite unexpectedly that amorphous thin layers of indium-tin-oxide (ITO), tin oxide, silicon (Si) or silicon carbide (SIC), when used as seed layers, significantly enhance the coercivity and perpendicular anisotropy of Co/Pt multilayer.

The above object is achieved by a magneto optic (MO) recording medium comprising a substrate, a seed layer and a recording multilayer deposited onto said seed layer wherein said seed layer has a thickness of less than 20 nm, and said multilayer includes alternating layers of platinum and cobalt or palladium and cobalt or platinum-palladium alloy and cobalt.

A preferred media structure comprises a transparent substrate, a thin transparent amorphous seed layer of ITO having a composition $(In_2O_3)_{1-x}(SnO_2)_x$, wherein $x=0.15$ to $1.0$, $SnO_2$, Si or SiC, a Co/Pt multilayer thin structure, and a lacquer protective layer.

The following are advantages of magnetooptic media made in accordance with this invention:

a) these seed layers significantly enhance the coercivity and squareness of the Kerr hysteresis loop;

b) these seed layers reduce the writing noise, increase the carrier and hence the general performance of the MO structure;

c) the thinness of the layers allows less deposition time; this reduces the thermal damage to the sensitive substrate and the mechanical stresses of the structure; and d) the small thickness of the seed layers permits an improved production throughput during manufacturing.

DETAILED DESCRIPTION OF THE INVENTION

Figure 1:
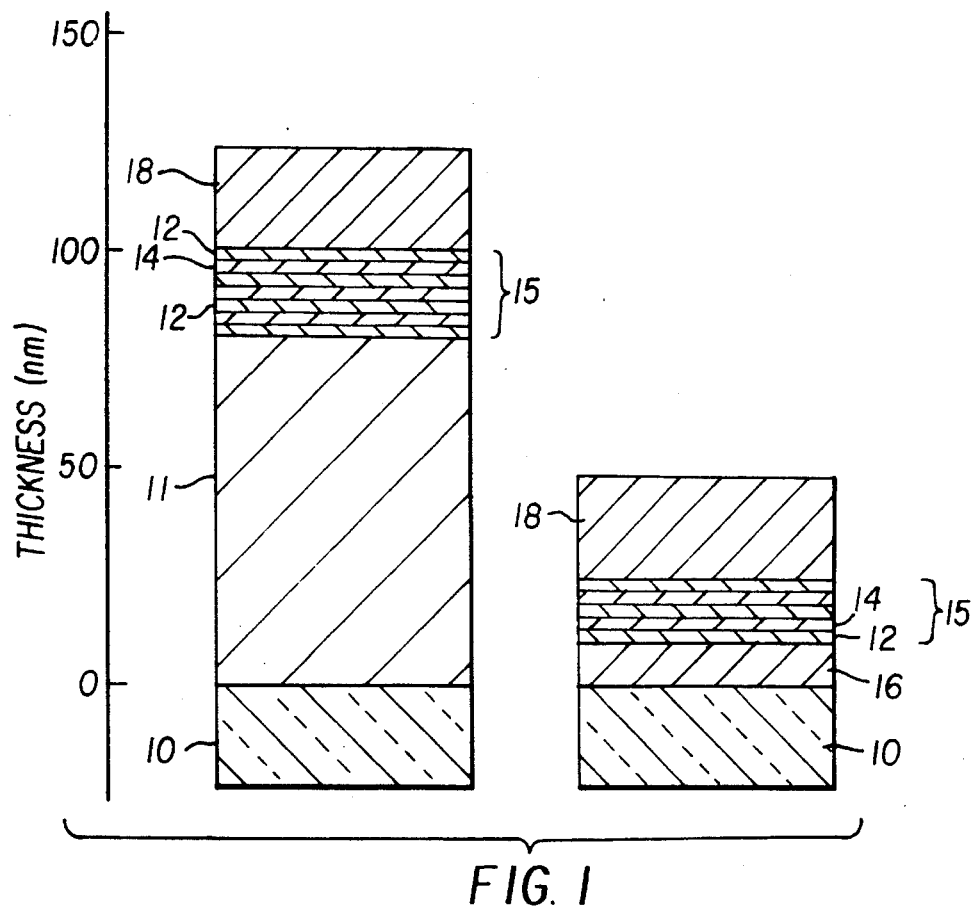
FIG. 1 shows a comparison between a prior art magnetooptic recording structure and one made in accordance with the invention.

Whenever the term amorphous is used it means a disordered structure in which present detection means such as x-ray defraction cannot detect any crystallinity. Turning first to FIG. 1, a schematic shows a prior art structure on the lefthand side, and on the righthand side, a magnetooptic structure made in accordance with the invention. The prior art structure is shown in S. Sumi et al, Abstract Mq-3, "Magnetooptic Recording International Symposium", (MORIS), December, 1992, Tuscon, Ariz. This drawing shows that magnetooptic structures made in accordance with the invention require much less thickness than the prior art and the thinness of these layers provide the advantages noted above.

The prior art device includes a substrate 10 which is made of polycarbonate and a thick first dielectric layer 11 made of ZnO. On the ZnO layer is a multilayer recording element 15 having alternating bilayers of Pt layer 12 and Co layer 14. As shown more clearly in FIG. 10, which will be discussed more fully later, the present invention includes a substrate 10 that can be made of glass or polycarbonate. Generally the substrate is transparent as light from a laser or other source will illuminate a recording multilayer structure as described through the substrate. On the substrate are provided a multilayer structure formed of alternating layers of Pt layer 12 and Co layer 14. Between the substrate and the multilayered recording element is a thin seed layer 16, which will be discussed later. The Pt layers typically having a range of from 0.4–2 nm and the Co layers have a thickness of 0.2–0.8 nm. Note that the reduced thickness of the seed layer, compared to prior art, permits the use of a thin Co/Pt multilayer while still maintaining the desired media reflectance. For seed layer thickness less than 20 nm, we have found Co/Pt multilayer thickness less than 20 nm is adequate to maintain reflectance. These structures are particularly suitable for use in magnetooptic disk, compact disk (CD) and photo compact disk (Photo CD).

With this type of structure, incident laser light illuminates a particular portion of the substrate, passes through the substrate, and interacts with the multilayered structure changing the Kerr rotation. As is well known, during readout, the Kerr rotation can be monitored to indicate whether a bit has been recorded. This prior art structure has been previously discussed and has a number of problems as noted above.

Figure 2:
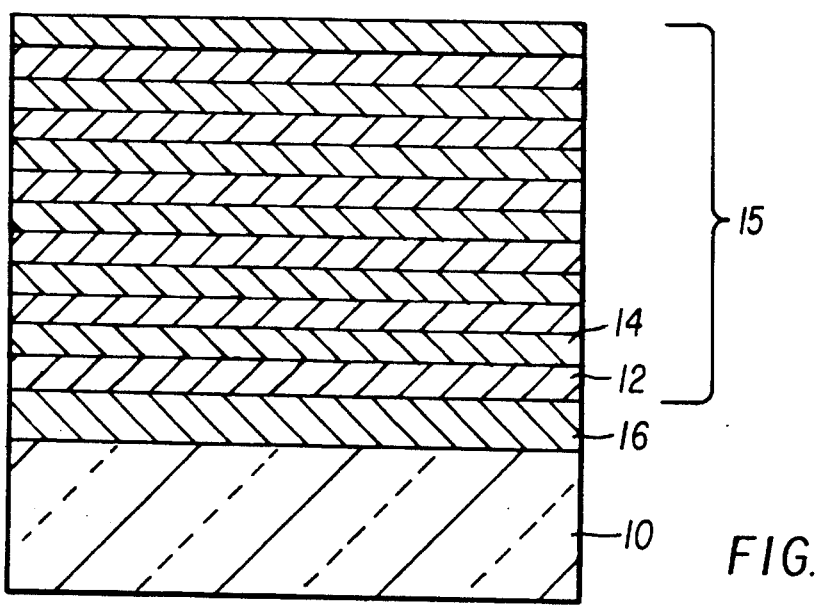
FIG. 2 shows an expanded version of a magnetooptic recording structure similar to FIG. 1 but without an overcoat layer.

Turning now to FIG. 2, we see a very similar structure which can be the same as that in FIG. 1 with the exception that there is no overcoat layer. A number of comparisons will later be made using devices with and without overcoat layers. The seed layer 16, in accordance with the invention, is formed from ITO, $SnO_2$, silicon Si, or SiC. ITO is a mixture of indium oxide ($In_2O_3$) and tin oxide ($SnO_2$). This seed layer is amorphous-like in structure and provides a number of advantages. The thickness of the seed layer should be less than 20 nm. Preferably, a UV curable lacquer layer is provided over the recording multilayer. This layer is scratch resistant and maintains structural integrity of the media. Also, a dielectric layer can be provided directly on the Co/Pt multilayer. This layer may be selected to be the same material as the seed layer or some other material. Its function is to thermally insulate the lacquer layer from the recording multilayer. It also can be selected to provide an optical enhancement function if the media is illuminated by light passing through it (front surface recording).

MAKING MO STRUCTURES

Thin structures of $In_2O_3$, $SnO_2$ and indium-tin oxide (ITO) were prepared by d.c. sputtering a homogenous target in Ar (or Kr) and Ar+1%$O_2$ (or Kr+1%$O_2$) atmosphere. Targets of varying amounts of $In_2O_3$ and $SnO_2$ prepared by hot-press method were used to obtain structures of various ITO compositions. Structures were deposited on glass and Si substrates. These structures were optically transparent in the 300–900 nm wavelength region, have high index of refraction and low extinction coefficient. The refractive index, n increased monotonically from 2.26 at 820 nm to 2.44 at 420 nm, while the absorption coefficient, k was smaller than 0.05.

Thin structures of Si and SiC were prepared by d.c. sputtering boron-doped Si and SiC targets respectively in Ar or Kr atmosphere. The refractive indices (n, k) were measured at 780 nm wavelength and were found to be (3.3, 0.07) for Si and (2.1, 0.005) for SiC respectively.

The crystallinity of $(In_2O_3)1-x\ SnO_2)x$ (x=0, 0.1, 0.25, 0.5, 0.75 and 1.0) structures was analyzed by x-ray diffraction and found to vary with the sputtering gas used and the deposition conditions. $In_2O_3$ structure was found to be crystalline whereas $SnO_2$ structure was amorphous irrespective of the sputter gas used. $(In_2O_3)_{90}(SnO_2)_{10}$ structure was crystalline when deposited in pure Ar but crystallinity decrease with the addition of 1%$O_2$ in Ar sputtering gas. In general, ITO structure becomes less crystalline or becomes amorphous-like as the content of $SnO_2$ in the structure increases and finally pure $SnO_2$ is completely amorphous. The crystallinity of Si and SiC were analysed by x-ray diffraction and found to be amorphous or amorphous-like.

The Co/Pt multilayers were prepared by d.c. sputtering Co and Pt targets in Ar or Kr atmosphere. The base pressure before depositing the structures was about $1.2 \times 10^{-6}$ Torr and deposition pressure was about 5–20 mT. Alternate layers of Co and Pt were deposited onto a substrate spinning over the Co and Pt targets. The thickness of each layer was controlled by controlling the deposition rate and the substrate rotation speed. The thickness of Co and Pt were 0.2–0.8 and 0.4–1.8 nm, respectively, and the number of bilayers was 5–23. A pair of adjacent layers of Pt and Co is referred to as a bilayer.

Several test samples were prepared by depositing the Co/Pt multilayers without and with seed layers on small test samples of glass and polycarbonate (PC) substrates. Structures were also deposited on the 5.25 dia. glass and PC substrates. Structures that were made are shown in FIGS. 1 and 2.

The perpendicular Kerr hysteresis loops were measured at 780 nm wavelength to obtain coercivity (Hc) and the Kerr rotation (θk) of the structures. The dynamic measurements of the MO structures were made under the following conditions: 5.6–7 m/sec disk velocity, 1 MHz carrier frequency, 33–50% duty cycle, 30 kHz bandwidth, 300 Oe bias field, 0–10 mW write power and 1.5–2.0 mw read power.

EXAMPLES

Figure 3A:
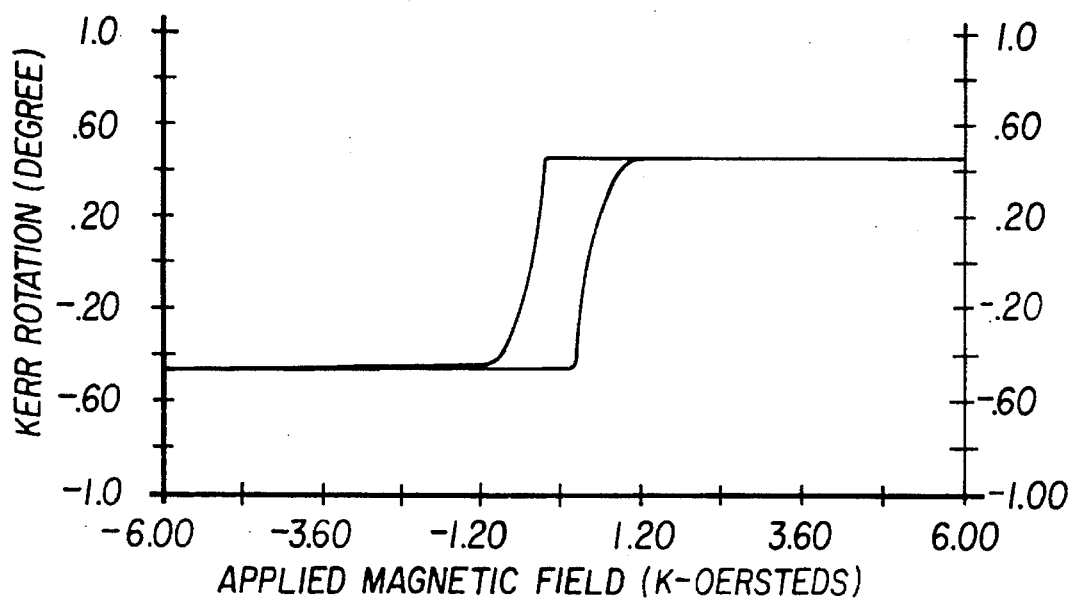
FIG. 3a shows a Kerr hysteresis loop plot without using a seed layer.

A Co/Pt multilayer structure with twelve bilayers was deposited on a 5.25" dia. glass substrate. The thickness of the individual Co and Pt lyers were 0.25 run and 0.8 nm respectively. The Kerr loop for this structure is shown in FIG. 3a. Coercivity and the Kerr rotation were 421 Oe and 0.45 degree respectively. FIG. 3a shows the plot of Kerr rotation (degree) versus magnetic field for the structure without a seed layer.

Figure 3B:
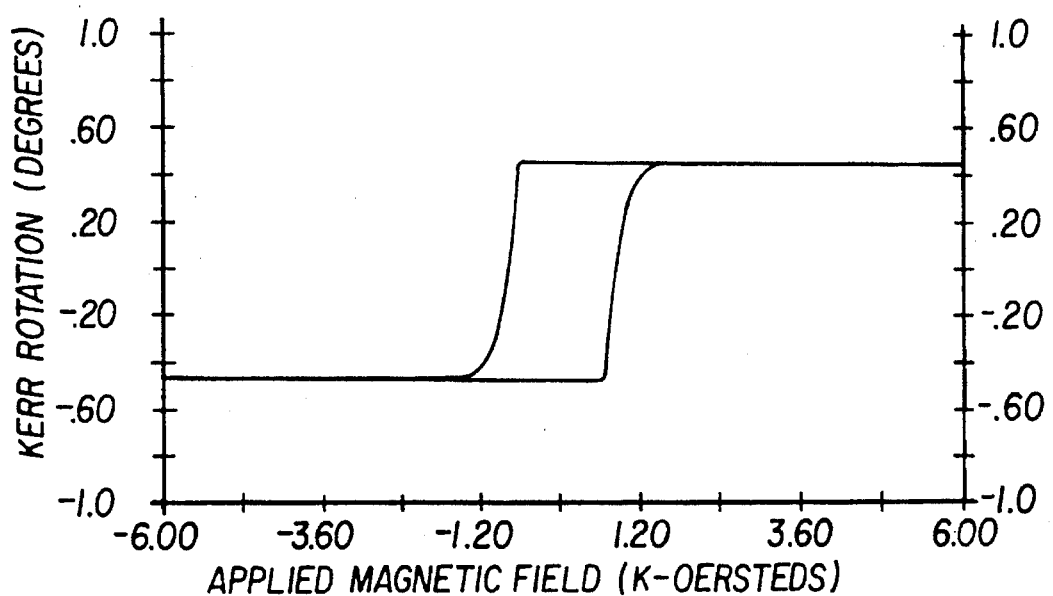
FIG. 3b shows a plot similar to FIG. 3a but with an ITO seed layer.

Another was prepared under the same conditions first by depositing a 0.75 nm amorphous seed layer of $(In_2O_3)_{25}(SnO_2)_{75}$ and then the twelve bilayers of the same composition Co/Pt multilayer structure. The Kerr loop of this structure is shown in FIG. 3b. Surprisingly, the Co/Pt multilayer structure deposited on ITO seed layer has substantially larger coercivity (Hc=1080 Oe and (θk)=0.48 degree) than that sputtered directly on the substrate. Also the squareness of the Kerr loop is tremendously improved. We will later show that this improvement in the squareness of the Kerr loop reduces the writing noise during recording.

The Kerr loops of the Co/Pt multilayer structures deposited on varying thicknesses of the ITO seed layers were measured. It was found that even a 0.2 nm thick ITO seed layer increases the coercivity of the Co/Pt multilayer significantly and improves the squareness of the Kerr loop dramatically. As the thickness of the seed layer increases, both coercivity and Kerr rotation increase monotonically without further improvement in squareness.

Figure 4A:
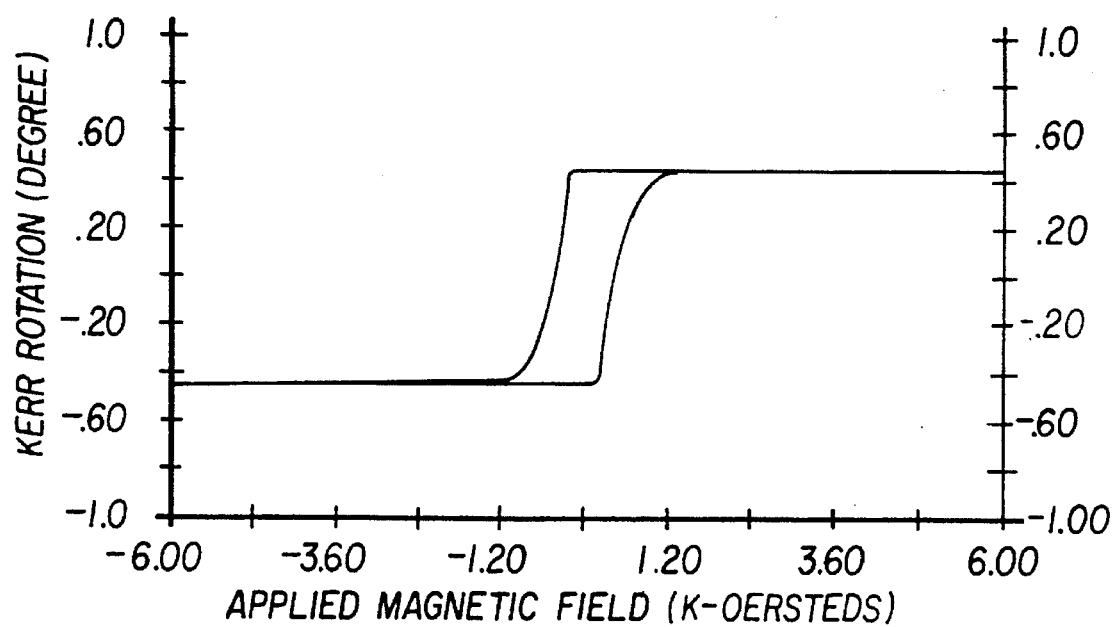
FIG. 4a is a plot which shows a Kerr hysteresis loop for a structure without a seed layer.
Figure 4B:
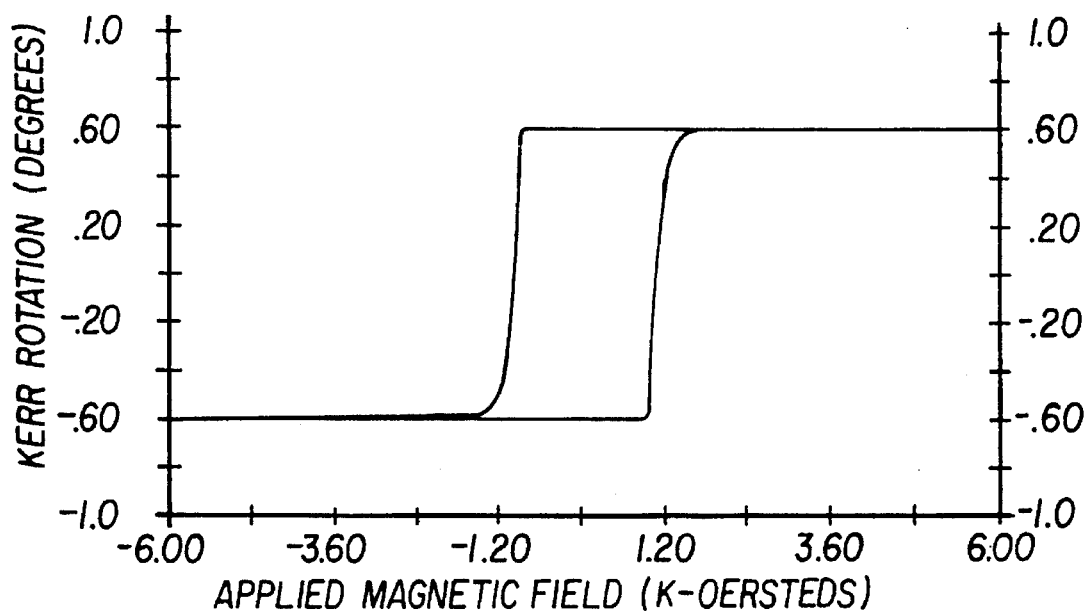
FIG. 4b shows a plot similar to FIG. 4a but with an $SnO_2$ seed layer.

Similar improvement in the coercivity and the Kerr loop squareness of the Co/Pt multilayer was obtained using the ultra thin amorphous seed layers of other In-Sn-O compositions and $SnO_2$. FIG. 4b shows the Kerr loop using 2.5 nm seed layer of $SnO_2$.

Figure 5A:
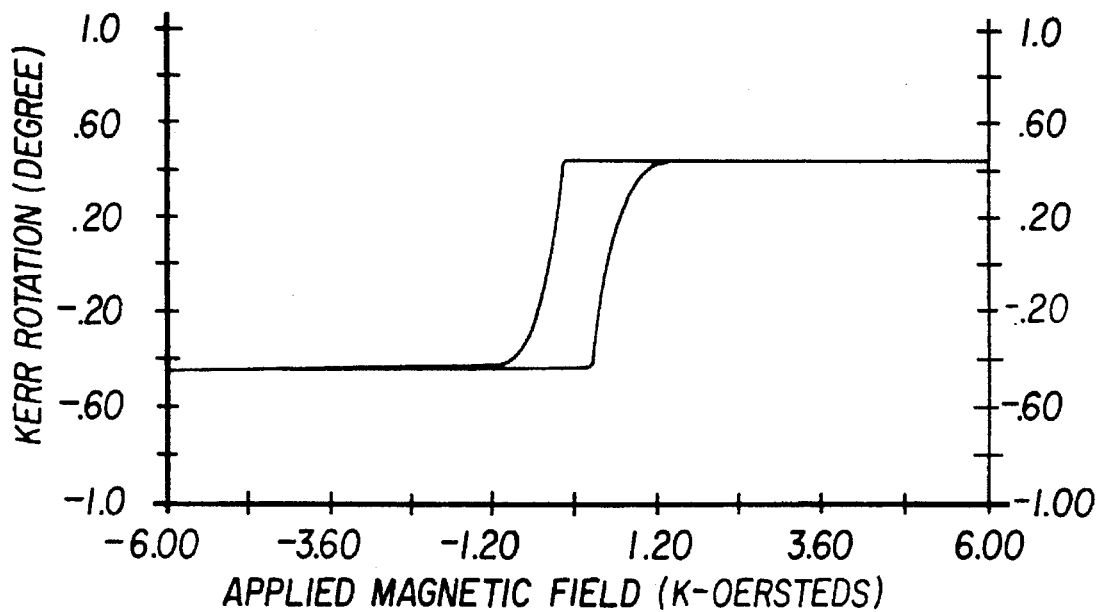
FIG. 5a shows a plot without a seed layer.
Figure 5B:
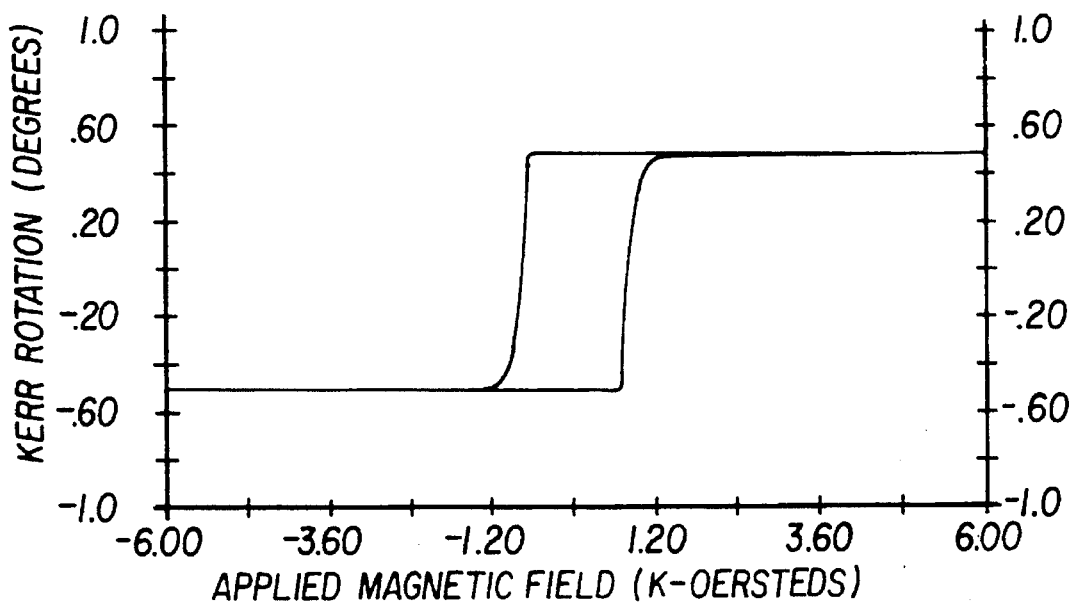
FIG. 5b shows a plot similar to FIG. 5a but with a Si seed layer.
Figure 6A:
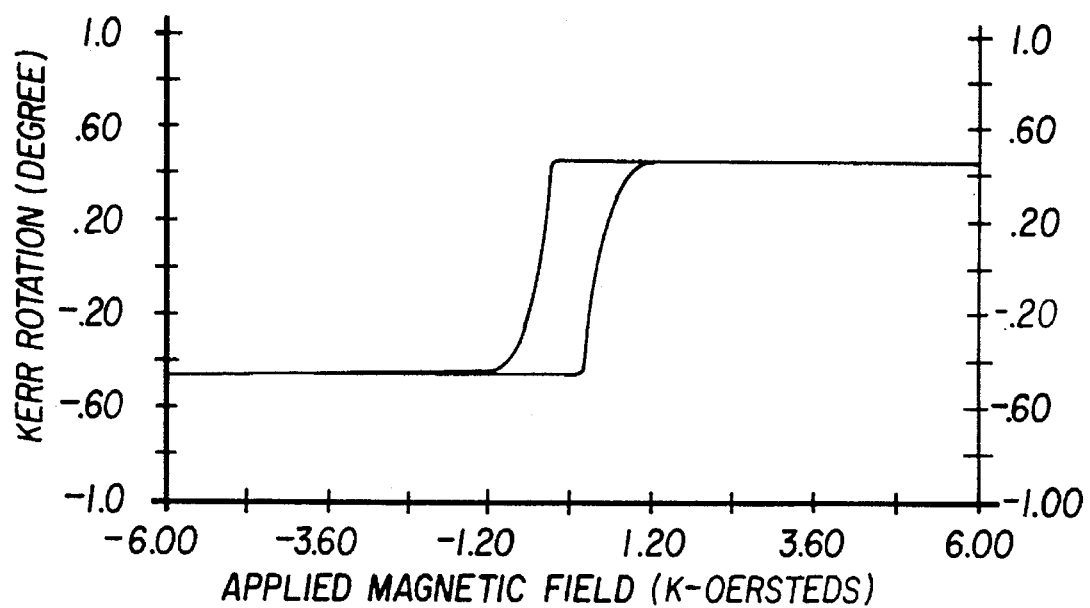
FIG. 6a shows a plot without a seed layer.
Figure 6B:
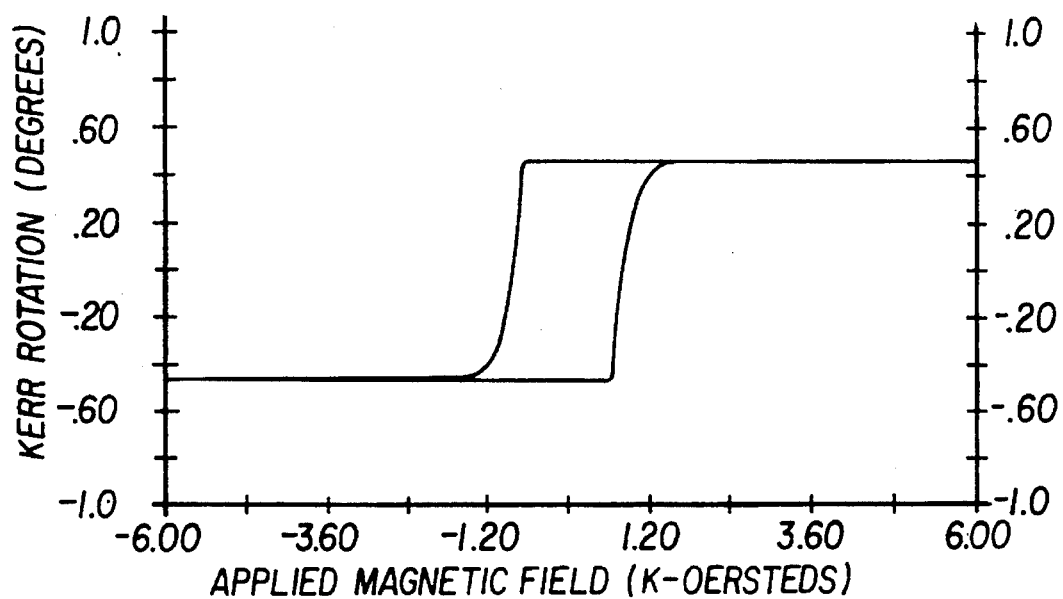
FIG. 6b shows a plot similar to FIG. 6a but with SiC seed layer.

Similar improvement in the coercivity and the Kerr loop squareness of the Co/Pt multilayer was obtained using the ultra thin amorphous seed layers of Si and SiC. FIG. 5b shows the Kerr loop using 5 nm seed layer of Si. Also FIG. 6b shows the Kerr loop using a 5 nm seed layer of SiC.

It is important to note that the ultra thin seed layers should be amorphous or amorphous-like to obtain a significant enhancement in the coercivity and squareness of the Kerr loop of the Co/Pt multilayer. For example, we have used 1–100 nm thick structures of $In_2O_3$ as seed layers for depositing Co/Pt multilayer structure. $In_2O_3$ thin structure is crystalline when prepared in Ar or Ar+1%$O_2$ atmosphere as seen by x-ray diffraction patterns. Even though 100 nm thick $In_2O_3$ structure shows a significant enhancement in the coercivity of the Co/Pt multilayer, there was an inadequate increase in the coercivity when $In_2O_3$ seed layers were thinner than 20 nm. Also this increase was smaller than that obtained with the same thickness of the ultra-thin amorphous seed layers.

Figure 7A:
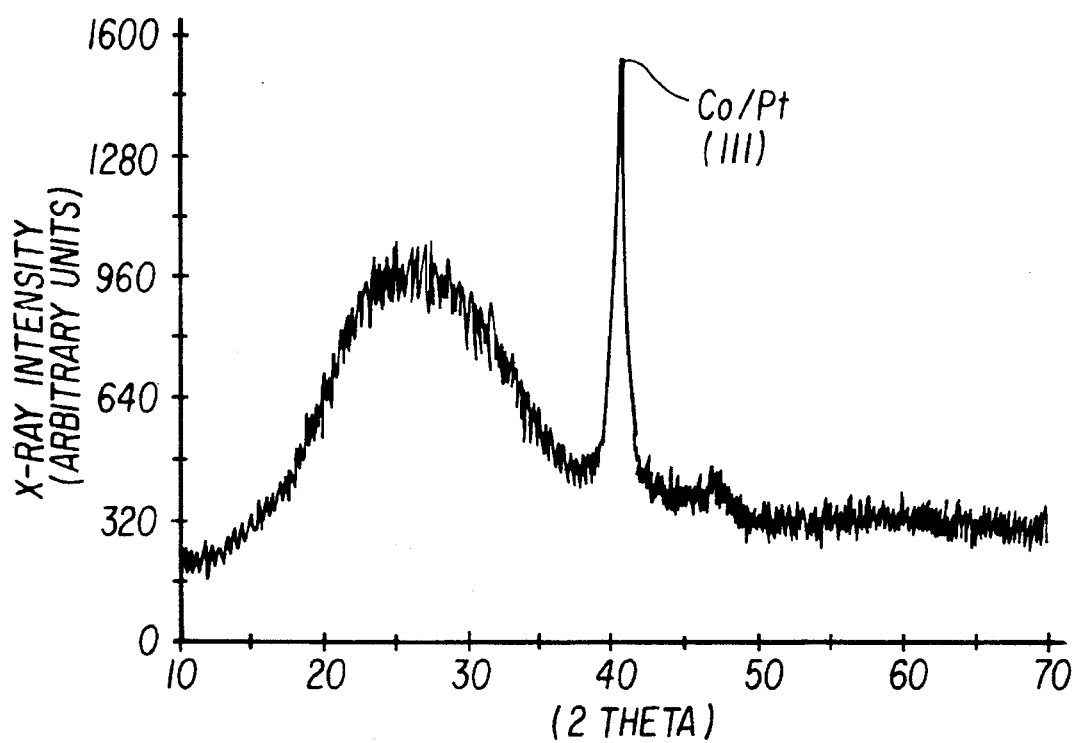
FIGS. 7a and 7b are x-ray diffractions showing the diffraction peak intensities for Co/Pt in the FIGS. 3a an 3b arrangements respectively.
Figure 7B:
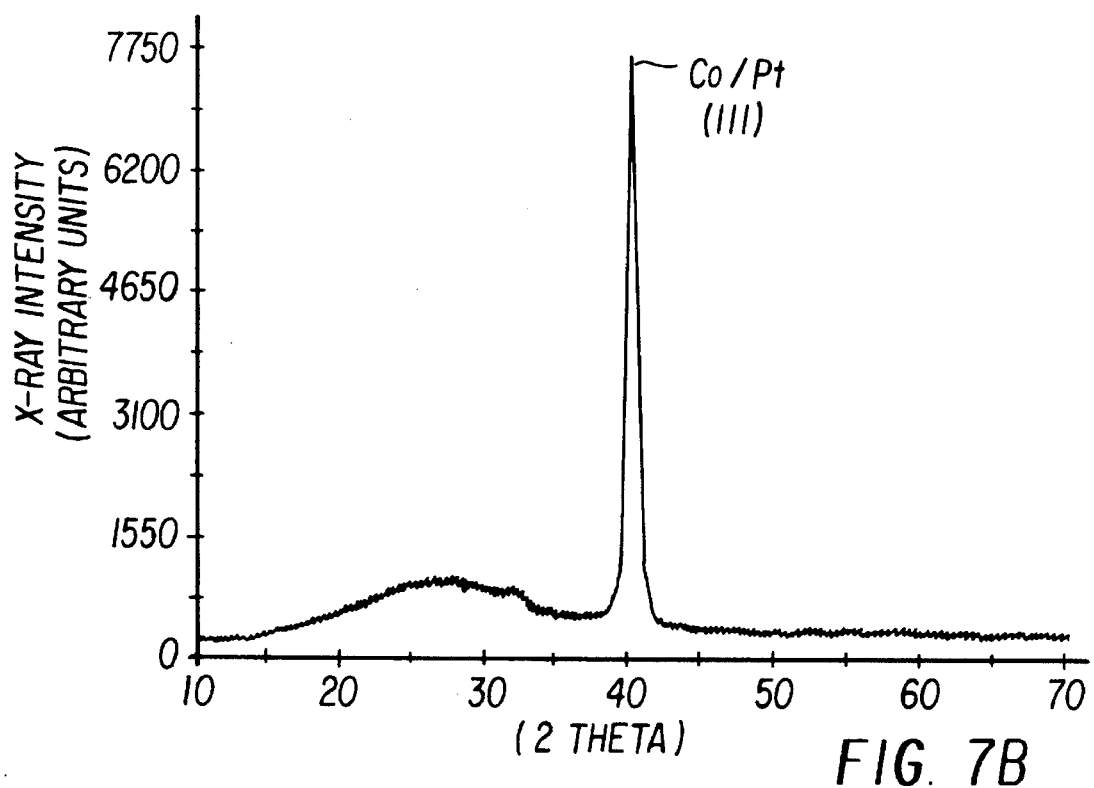

FIG. 7a shows X-ray diffraction patterns for the Co/Pt structure without a seed layer and with a 0.4 nm ITO seed layer deposited on glass substrate. The intensity of the main Co/Pt(111) peak as shown in FIG. 7b was much higher than that without any seed layer. These results indicate that a very thin ITO seed layer improves the ordering of the multilayer structures, similar results were obtained from the low angle x-ray diffraction patterns and indicated that the flatness of the structure surface and layer interfaces are improved with a seed layer. Atomic force microscopy (AFM) study shows very smooth surfaces for both the structures, but the surface roughness was higher for the structure without a seed layer.

At this time the mechanism of improvement in the magnetic properties of Co/Pt multilayer due to ultra thin amorphous or amorphous-like seed layers is not completely understood. However, we believe that this mechanism is different than that observed for thick crystalline seed layers. Monolayers of amorphous materials may reduce the substrate surface energy and orient the subsequently deposited Co/Pt multilayer in a preferred direction, thus enhancing the magnetic anisotropy and the coercivity of the Co/Pt multilayer. On the other hand, thick crystalline seed layers are highly oriented structures. For example, ZnO thick structure which was used as a seed layer in European Patent Application 0304927 (1989) supra has c-axis oriented normal to structure plane. These highly textured or oriented seed layers are thought to improve the texture and growth of Co/Pt multilayer. In the Carcia et al letter supra, it was shown that the better the crystalline nature of this thick seed layer the higher the coercivity of Co/Pt multilayer.

Figure 8A:
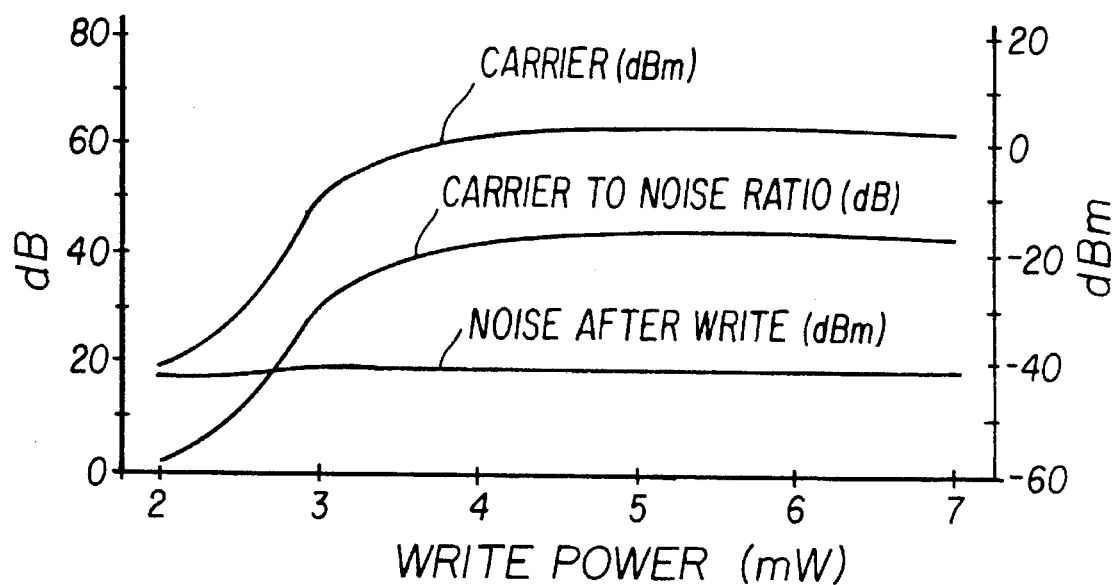
FIG. 8a and 8b are plots which respectively show carrier signal, noise and carrier to noise ratios as a function of the write power for different MO media structures made in accordance with the invention.
Figure 8B:
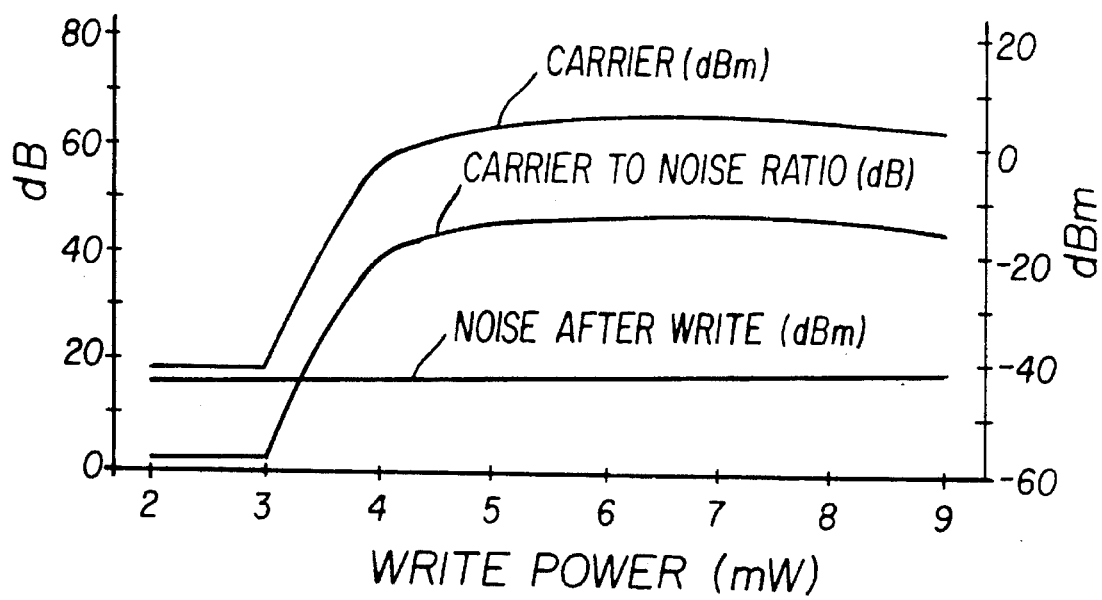

Several full structure disks were prepared by depositing Co/Pt multilayer with or without thin seed layers on 5.25" dia. polycarbonate and glass substrates. These disks were tested for dynamic performance. FIGS. 8a and 8b show the carrier (C), noise (N) and carrier to noise ratio (at 0.7 μm mark length, 5.6 m/s disk velocity, 300 Oe bias field, 1.5 mw read power, 1 MHz carrier frequency and 30 kHz bandwidth) as a function of write power obtained for two Co/Pt multilayer disks without a seed layer and with a 0.75 nm ITO seed layer deposited on PC substrates. The comparison reveals that significantly lower noise and a higher CNR is obtained in the MO structure with an ultra-thin amorphous ITO seed layer.

Figure 9:
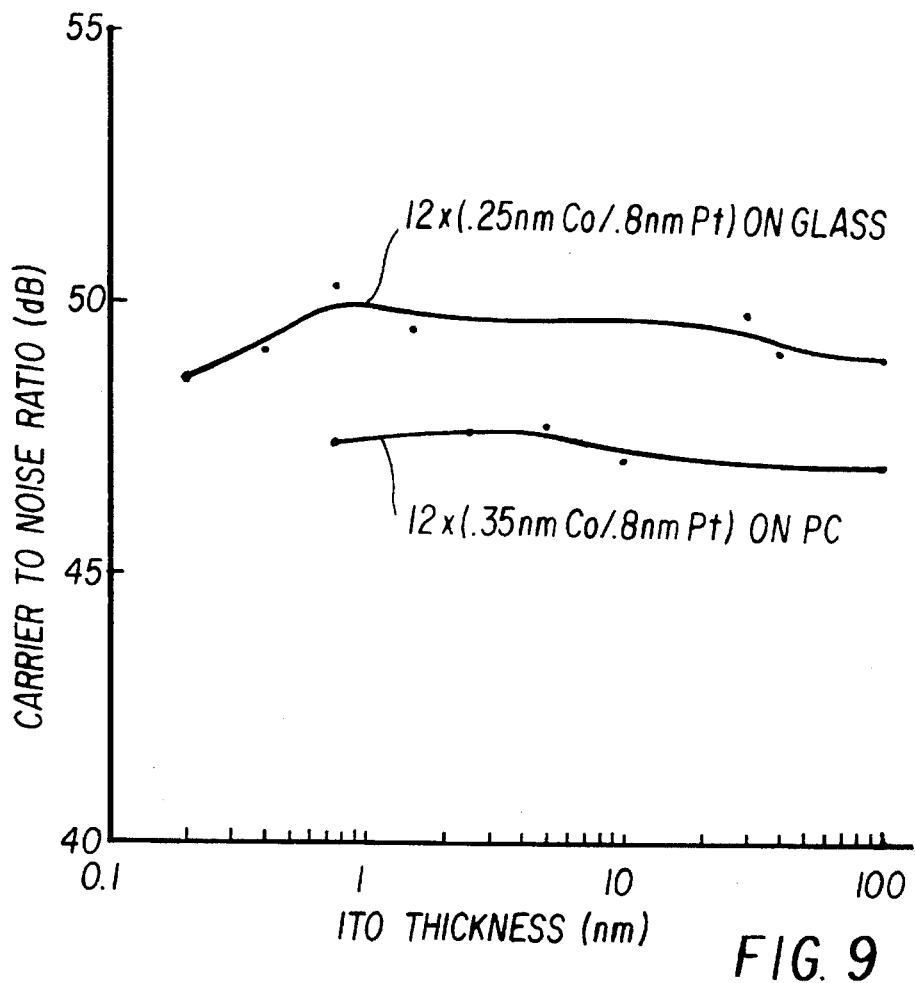
FIG. 9 is a plot showing the carrier to noise ratio for various Co/Pt ratios as a function of ITO seed layer thickness.

FIG. 9 and the remaining drawings show the CNR as a function of ITO seed layer thickness for various compositions of 12 bilayers of cobalt and platinum. Significant improvement in the carrier to noise ratio (CNR) of the Co/Pt multilayer disk is obtained even with 0.2 nm ITO seed layer. Also note that the CNR obtained using thin (thickness <20 m) ITO seed layers are similar to that obtained from the MO structures using thick (thickness 20–100 nm) seed layers. It should be noted that noise level in a disk using amorphous seed layers such as $SnO_2$, ITO, Si, and SiC were consistently lower by 1–2 dB than those using a crystalline seed layer.

Figure 10:
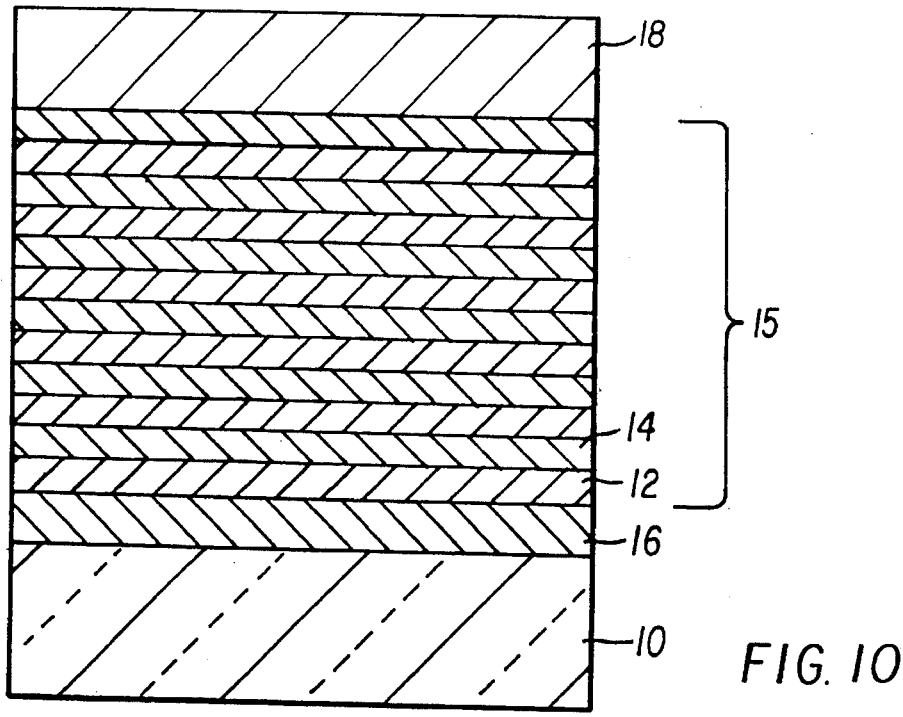
FIG. 10 is a schematic of an MO structure having the Co/Pt multilayer disk structure with a seed layer and overcoated with a protective organic lacquer in accordance with the invention.

FIG. 10 shows another MO structure in accordance with the invention but which includes a UV cured lacquer overlayer 18. An example of such a lacquer is "Daicure Clear SD-17", a UV curable acrylic resin available from Dainippon Ink and Chemicals, Inc. The lacquer is typically applied by a spin coating technique and cured in the presence of UV light. This arrangement improves stability of the Co/Pt multilayer media. We found that even though Co/Pt multilayers have good chemical (corrosion and oxidation resistance) and thermal stability, they do not have good mechanical durability. We also observed the degradation of carrier level and increase in the bit error rate (BER) by repetitive write/erase process. This was ascribed to the deformation or delamination of the multilayer structure from the substrate surface. For putting Co/Pt multilayer media into a practical applications, we improved mechanical durability of these structures by overcoating the MO structure with a protective layer of UV cure organic lacquer. UV curable resin was overcoated as a protective layer about 5–10 μm thick by spin coating method.

Figure 11A:
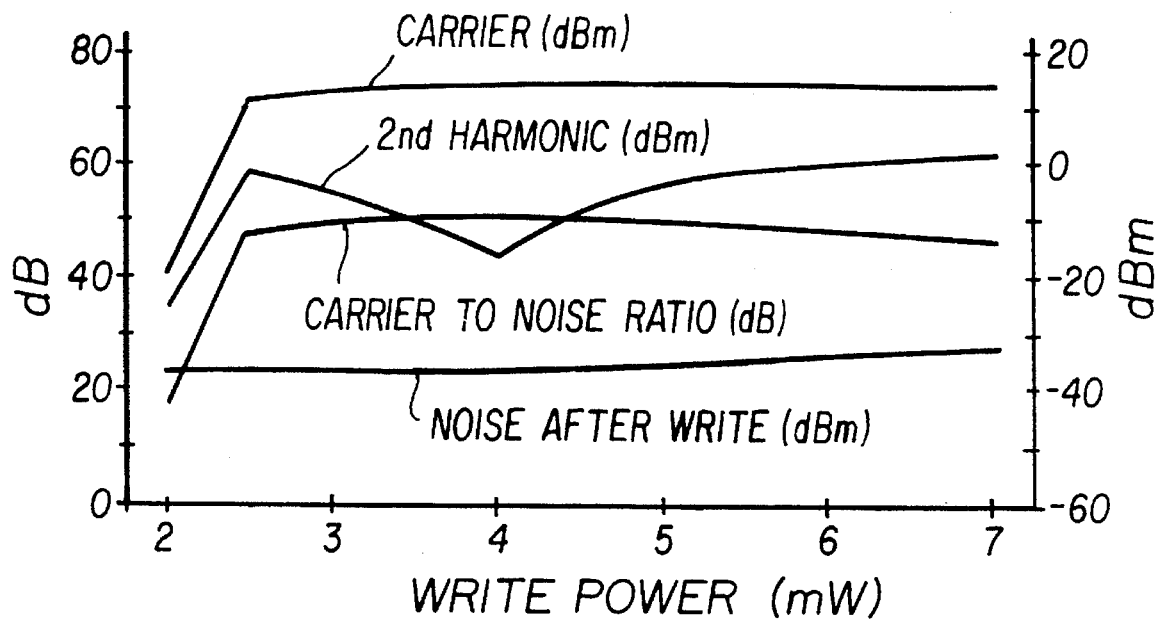
FIG. 11a and 11b show carrier, noise, and carrier to noise ratios and second harmonic minimum (SHM) as a function of write power for structures made without, and with, a lacquer overcoat, respectively.
Figure 11B:
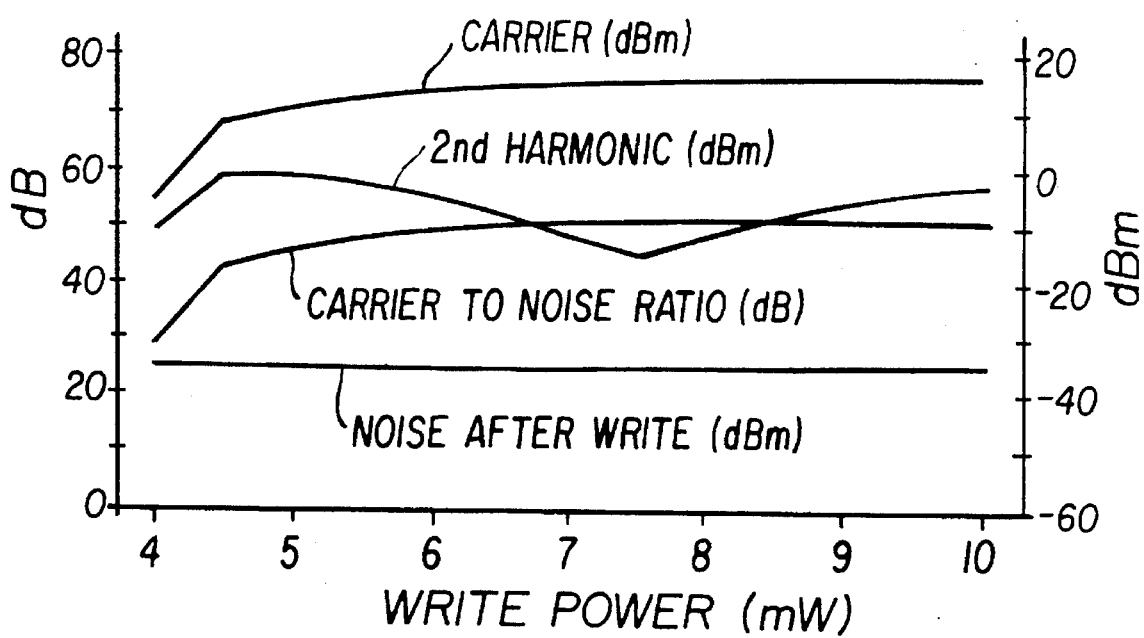

FIGS. 11a and 11b, respectively, show the dynamic performance of the Co/Pt multilayer disk with a 2.5 nm ITO seed layer before and after an UV cure lacquer overcoat. Carrier, noise, carrier to noise ratio and second harmonic minimum are shown as a function of write power for the Co/Pt multilayer disk before and after an UV cured lacquer overcoat. Dynamic testing was carried out at 7 m/s disk velocity, 1 MHz carrier frequency, 50% duty cycle, 30 KHz bandwidth, 300 Oe bias field and 1.5 mW read power. The comparison indicate that the optimum recording power increases with the lacquer overcoat without significantly affecting the carrier and noise levels.

Figure 12:
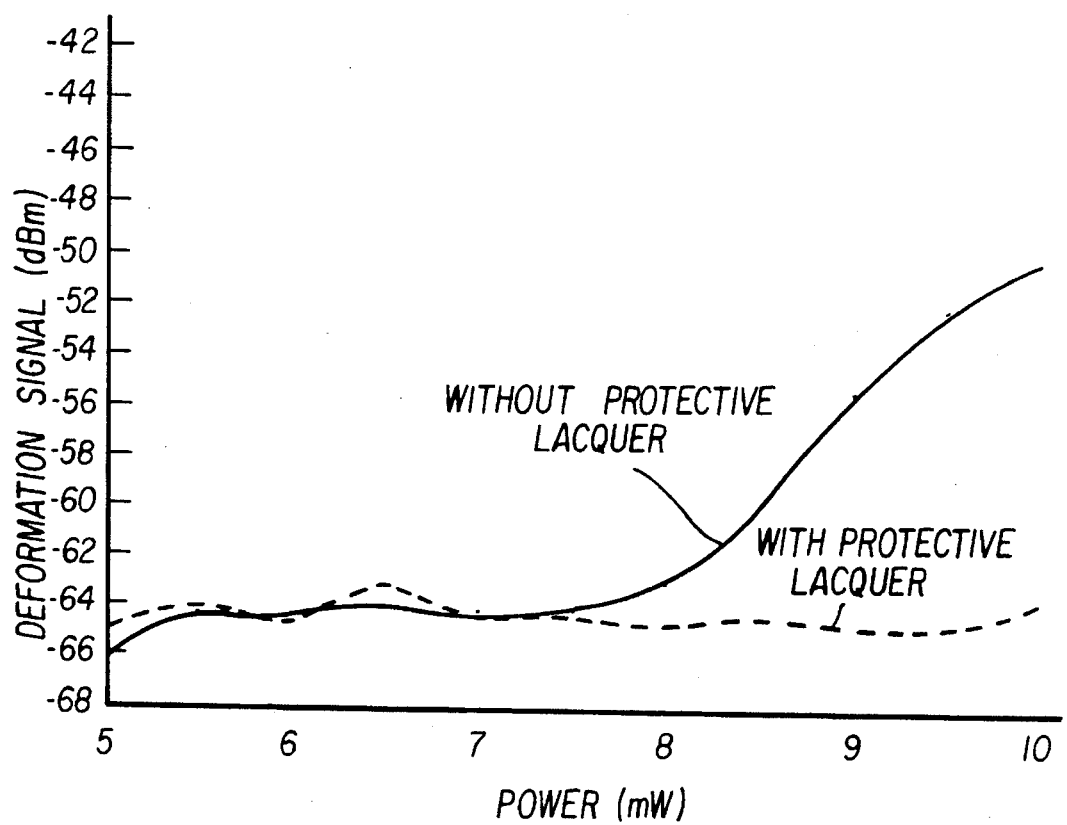
FIG. 12 depicts deformation signal as a function of write power for various structures made with and without a protective lacquer overcoat.
Figure 13:
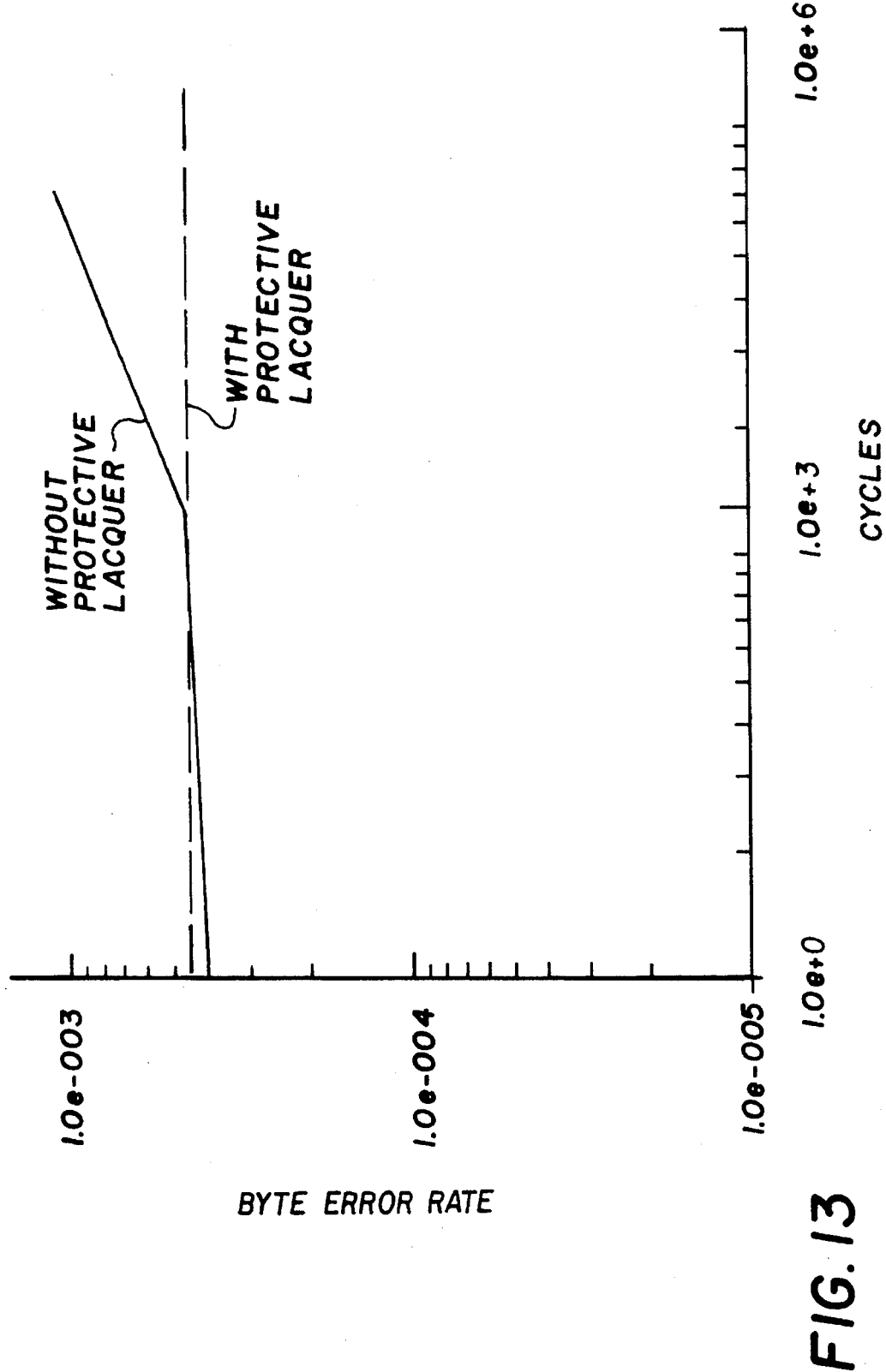
FIG. 13 is a graph of bit error rate as a function of erase/write cycles for several structures with a protective lacquer overcoat.

The improvement in the reliability of the MO structure with the lacquer overcoat can be better appreciated from the data shown in FIGS. 12 and 13. FIG. 12 shows the deformation signal as function of write power for various Co/Pt disks with and without a protective lacquer overcoat. In this case, recording was done as a function of power level on a disk using a separate track for each writing power level. The MO structure was then bulk erased using a 15 kOe magnet to get rid off all MO signal. The residual signal was read from the individual track using the sum mode of the dynamic tester. This residual signal was assigned to the deformation of the structure when the MO structure was written with increasing power level. As shown in FIG. 12, there was almost no deformation of the lacquer overcoated disks.

FIG. 13 shows the write bit error rate (BER) as a function of the write/erase cycles. Disk without a lacquer overcoat showed a significant increase in the BER with $10^4$ cycles. Whereas the MO structures with the protective lacquer overcoat did not indicate any increase in the BER even after $10^6$ cycles.

The invention has been described in detail with particular reference to certain preferred embodiments thereof, but it will be understood that variations and modifications can be effected within the spirit and scope of the invention.

PARTS LIST 10 substrate
11 dielectric layer
12 Pt layer
14 Co layer
15 multilayer recording element
16 seed layer
18 overcoat

We claim:

1. A magnetooptic medium comprising a substrate, an amorphous seed layer selected from the group consisting of $(In_2O_3)_{1-x}(SnO_2)_x$, wherein $x=0.25$ to $0.75$, Si and SiC and a recording multilayer deposited onto the said seed layer wherein said seed layer has a thickness of greater than 0 nm and less than or equal to 18 nm and is selected to improve the coercivity and squareness of the Kerr hysteresis loop of the recording multilayer, said recording multilayer including alternating layers of cobalt and platinum, or cobalt and palladium, or cobalt and platinum-palladium alloy.

2. The magnetooptic recording medium of claim 1 wherein a layer of dielectric material is deposited on the recording multilayer.

3. The magnetooptic medium of claim 1 further including a UV curable lacquer overcoat provided over the multilayer.

4. The magnetooptic recording element of claim 1 wherein the multilayer is Co/Pt, and the total thickness of the seed layer and the Co/Pt multilayer is less than 40 nm.

5. The magnetooptic recording element of claim 1 wherein the multilayer is Co/Pt, an d the total thickness of the seed layer and the Co/Pt multilayer is less than 20 nm.

6. The magnetooptic recording medium of claim 1 wherein said multilayer film contains 5–25 bilayers of Co and Pt, the Co and Pt thickness varies between 0.2 to 0.8 nm and 0.4 to 1.8 nm, respectively.

7. The magnetooptic medium of claim 2 further including a UV curable lacquer overcoat on the dielectric layer.

8. A magnetooptic medium comprising:

a substrate;

an amorphous seed layer selected from the group consisting of $(In_2O_3)_{1-x}(SnO_2)_x$, wherein $x=0.25$ to $0.75$, Si, and SiC;

a recording multilayer deposited onto the said seed layer wherein said seed layer has a thickness of greater than 0 nm and less than or equal to 18 nm and is selected to improve the coercivity and squareness of the Kerr hysteresis loop of the recording multilayer, said recording multilayer includes alternating layers of cobalt and platinum, or cobalt and palladium, or cobalt and platinum-palladium alloy; and a UV curable lacquer overcoat provided over the multilayer.

* * * * *